(12) United States Patent
Kasparek

(10) Patent No.: US 12,504,448 B2
(45) Date of Patent: Dec. 23, 2025

(54) CONDUCTOR DESIGN WITH IMPROVED CROSS-TALK ERROR

(71) Applicant: Allegro MicroSystems, LLC, Manchester, NH (US)

(72) Inventor: Christian Kasparek, Heidelberg (DE)

(73) Assignee: Allegro MicroSystems, LLC, Manchester, NH (US)

( * ) Notice: Subject to any disclaimer, the term of this patent is extended or adjusted under 35 U.S.C. 154(b) by 172 days.

(21) Appl. No.: 18/447,665

(22) Filed: Aug. 10, 2023

(65) Prior Publication Data

US 2025/0052791 A1 Feb. 13, 2025

(51) Int. Cl.
| | | |
|---|---|---|
| *G01R 15/20* | (2006.01) | |
| *G01R 19/00* | (2006.01) | |
| *G01R 33/07* | (2006.01) | |
| *G01R 33/09* | (2006.01) | |
| *G01R 33/00* | (2006.01) | |

(52) U.S. Cl.
CPC ....... *G01R 15/207* (2013.01); *G01R 19/0092* (2013.01); *G01R 33/072* (2013.01); *G01R 33/091* (2013.01); *G01R 33/0029* (2013.01)

(58) Field of Classification Search
CPC .............. G01R 15/207; G01R 19/0092; G01R 33/072; G01R 33/091; G01R 33/0029
See application file for complete search history.

(56) References Cited

U.S. PATENT DOCUMENTS

| | | | |
|---|---|---|---|
| 5,041,780 A * | 8/1991 | Rippel | G01R 15/207 |
| | | | 324/251 |
| 11,047,884 B2 * | 6/2021 | Shimizu | G01R 19/0092 |
| 11,150,273 B2 | 10/2021 | Liu et al. | |
| 11,226,382 B2 * | 1/2022 | Augendre | G01R 33/09 |
| 11,320,466 B1 | 5/2022 | Briano et al. | |
| 11,561,112 B2 | 1/2023 | Briano et al. | |
| 11,656,250 B2 | 5/2023 | Vuillermet et al. | |
| 12,044,708 B2 * | 7/2024 | Zhao | G01R 15/207 |
| 12,306,217 B2 | 5/2025 | Houis | |
| 2008/0094060 A1 * | 4/2008 | Muraki | G01R 15/207 |
| | | | 324/252 |
| 2015/0204915 A1 * | 7/2015 | Okuyama | G01R 15/207 |
| | | | 324/117 R |
| 2015/0204916 A1 * | 7/2015 | Akimoto | G01R 15/207 |
| | | | 702/64 |
| 2015/0204919 A1 * | 7/2015 | Akimoto | G01R 15/207 |
| | | | 324/244 |
| 2021/0311136 A1 * | 10/2021 | Augendre | G01R 19/0092 |
| 2022/0283200 A1 * | 9/2022 | Friedrich | G01R 15/202 |
| 2023/0071087 A1 * | 3/2023 | Vuillermet | G01R 15/207 |

(Continued)

*Primary Examiner* — Dominic E Hawkins
(74) *Attorney, Agent, or Firm* — Daly, Crowley, Mofford & Durkee, LLP

(57) ABSTRACT

A system, comprising: a conductor having a pair of primary surfaces, the conductor including a through-hole formed therein, the conductor including a first notch that is formed adjacent to the through-hole; and a printed circuit board that is inserted in the through-hole, the printed circuit board having a current sensor mounted thereon, the current sensor being disposed inside the through-hole, the current sensor including a first magnetic field sensing element and a second magnetic field sensing element having respective axes of maximum sensitivity that are substantially perpendicular to the primary surfaces of the conductor.

24 Claims, 16 Drawing Sheets

(56) References Cited

U.S. PATENT DOCUMENTS

| | | | |
|---|---|---|---|
| 2023/0251290 A1* | 8/2023 | Vuillermet | G01R 19/0092 |
| | | | 324/126 |
| 2023/0258693 A1* | 8/2023 | Rock | G01R 15/207 |
| | | | 324/126 |
| 2023/0298779 A1 | 9/2023 | Messier et al. | |
| 2023/0384352 A1 | 11/2023 | Messier et al. | |
| 2023/0417802 A1 | 12/2023 | Vuillermet et al. | |
| 2024/0003995 A1 | 1/2024 | Rock et al. | |
| 2024/0004016 A1 | 1/2024 | Vuillermet et al. | |
| 2024/0012034 A1* | 1/2024 | Uhlig | G01R 15/20 |

* cited by examiner

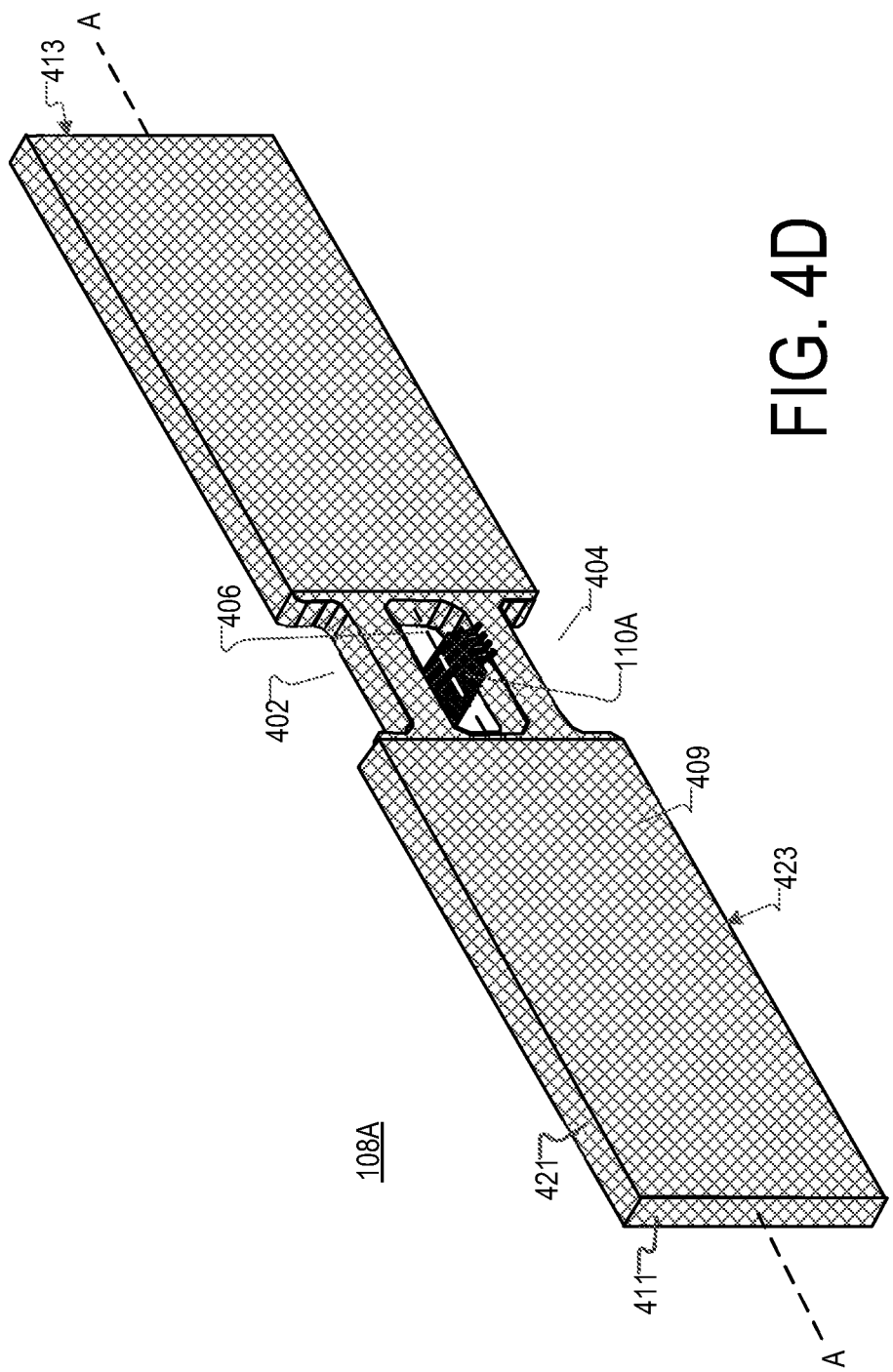

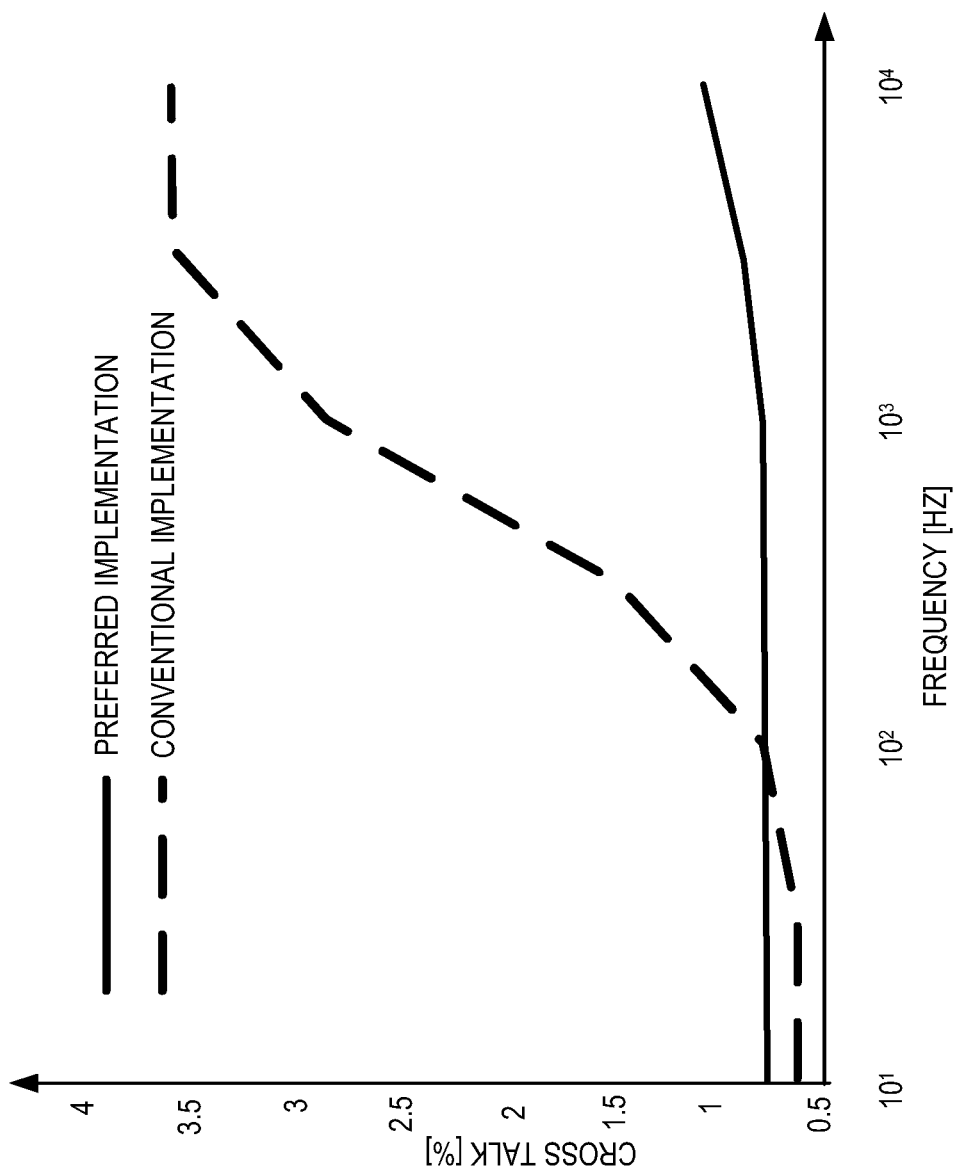

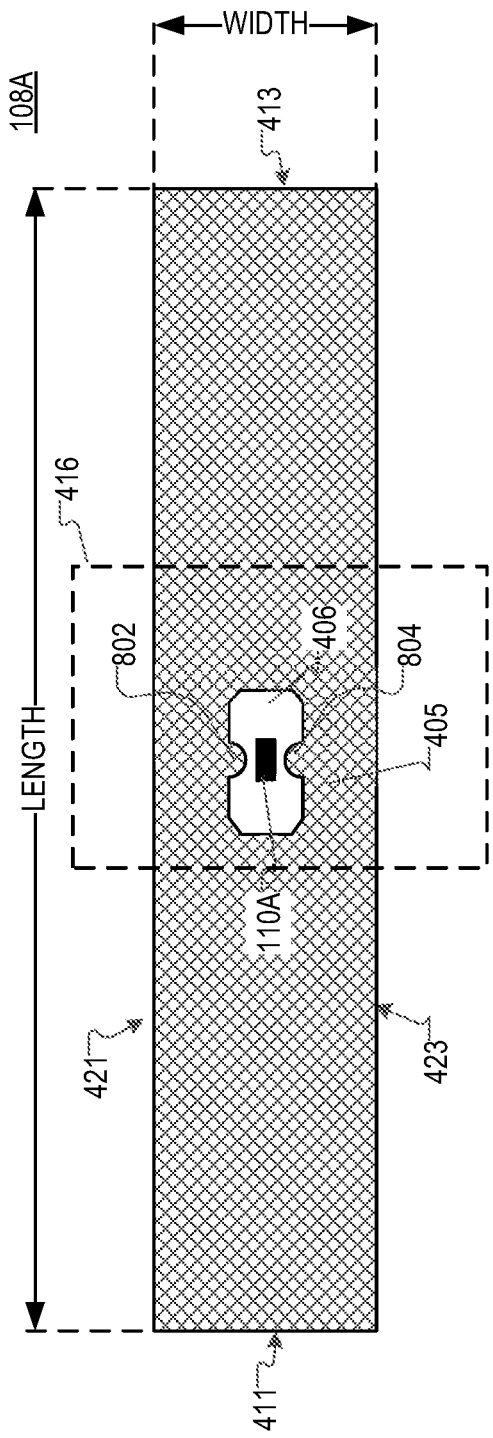

CONDUCTOR DESIGN WITH IMPROVED CROSS-TALK ERROR

BACKGROUND

As is known, sensors are used to perform various functions in a variety of applications. Some sensors include one or magnetic field sensing elements, such as a Hall effect element or a magnetoresistive element, to sense a magnetic field associated with proximity or motion of a target object, such as a ferromagnetic object in the form of a gear or ring magnet, or to sense a current, as examples. Sensor integrated circuits are widely used in automobile control systems and other safety-critical applications. There are a variety of specifications that set forth requirements related to permissible sensor quality levels, failure rates, and overall functional safety.

SUMMARY

According to aspects of the disclosure, a system is provided, comprising: a first conductor having a pair of first primary surfaces, the first conductor including a first through-hole formed therein, the first conductor including a first notch that is formed adjacent to the first through-hole; a second conductor having a pair of second primary surfaces, the second conductor including a second through-hole formed therein, the second conductor including a second notch that is formed adjacent to the second through-hole; and a printed circuit board that is inserted in the first through-hole and the second through-hole, the printed circuit board having a first current sensor and a second current sensor mounted thereon, the first current sensor being disposed inside the first through-hole and the second current sensor being disposed inside the second through-hole, the first current sensor including at least two first magnetic field sensing elements having respective axes of maximum sensitivity that are substantially perpendicular to the second primary surfaces of the second conductor, and the second current sensor including at least two second magnetic field sensing elements having respective axes of maximum sensitivity that are substantially perpendicular to the first primary surfaces of the first conductor.

According to aspects of the disclosure, a system is provided, comprising: a conductor having a pair of primary surfaces, the conductor including a through-hole formed therein, the conductor including a first notch that is formed adjacent to the through-hole; and a printed circuit board that is inserted in the through-hole, the printed circuit board having a current sensor mounted thereon, the current sensor being disposed inside the through-hole, the current sensor including a first magnetic field sensing element and a second magnetic field sensing element having respective axes of maximum sensitivity that are substantially perpendicular to the primary surfaces of the conductor.

According to aspects of the disclosure, a system is provided, comprising: a conductor having a through-hole formed therein, the conductor including a first protrusion that extends from a first side of the through-hole towards a second side of the through-hole, the second side being opposite to the first side; and a current sensor that is disposed in the through-hole, the current sensor being disposed adjacent to the first protrusion, the current sensor being arranged to measure a level of electrical current through the conductor.

BRIEF DESCRIPTION OF THE DRAWINGS

The foregoing features may be more fully understood from the following description of the drawings in which:

FIG. 4D is a perspective view of a system including the conductor of FIG. 4A, according to aspects of the disclosure;

FIG. 7C is a graph illustrating aspects of the operation of the conductor of FIG. 4A, according to aspects of the disclosure;

FIG. 8A is a planar top-down view of an example of a conductor, according to aspects of the disclosure;

FIG. 8B is a planar side view of the conductor of FIG. 8A, according to aspects of the disclosure.

DETAILED DESCRIPTION

Figure 1:
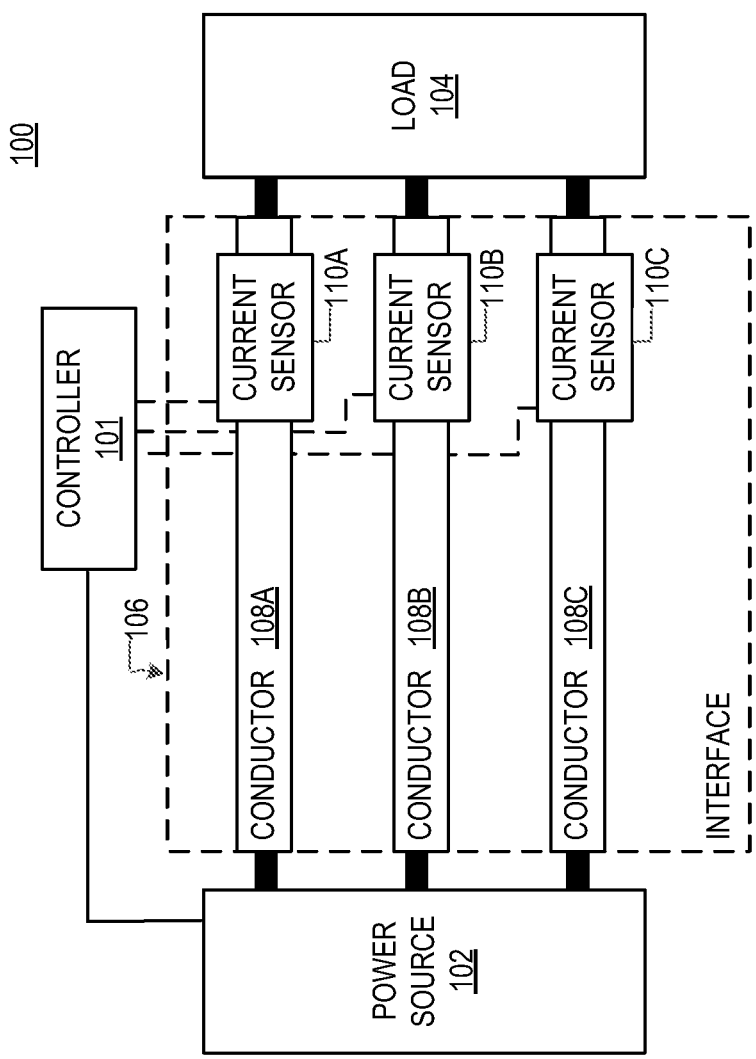
FIG. 1 is a diagram of an example of a system, according to aspects of the disclosure.

FIG. 1 is a diagram of an example of a system 100, according to aspects of the disclosure. As illustrated, system 100 may include a controller 101 and a power source 102 that is coupled to an electric motor 104 via an interface 106. Interface 106 may include conductors 108A-C. Each of conductors 108A-C may include one or more metal layers (or layers of another conductive material). Each of conductors 108A-C may be used to deliver, to the electric motor 104, current that is supplied by the power source 102. Controller 101 may be coupled to the current sensors 110A-C. Controller 101 may use the current sensors 110A-C to measure the level of the current that is being supplied by the power source 102 to the electric motor 104 and make adjustments to the operation of the power source 102 and/or the electric motor 104 in response to the measurements.

Figure 2:
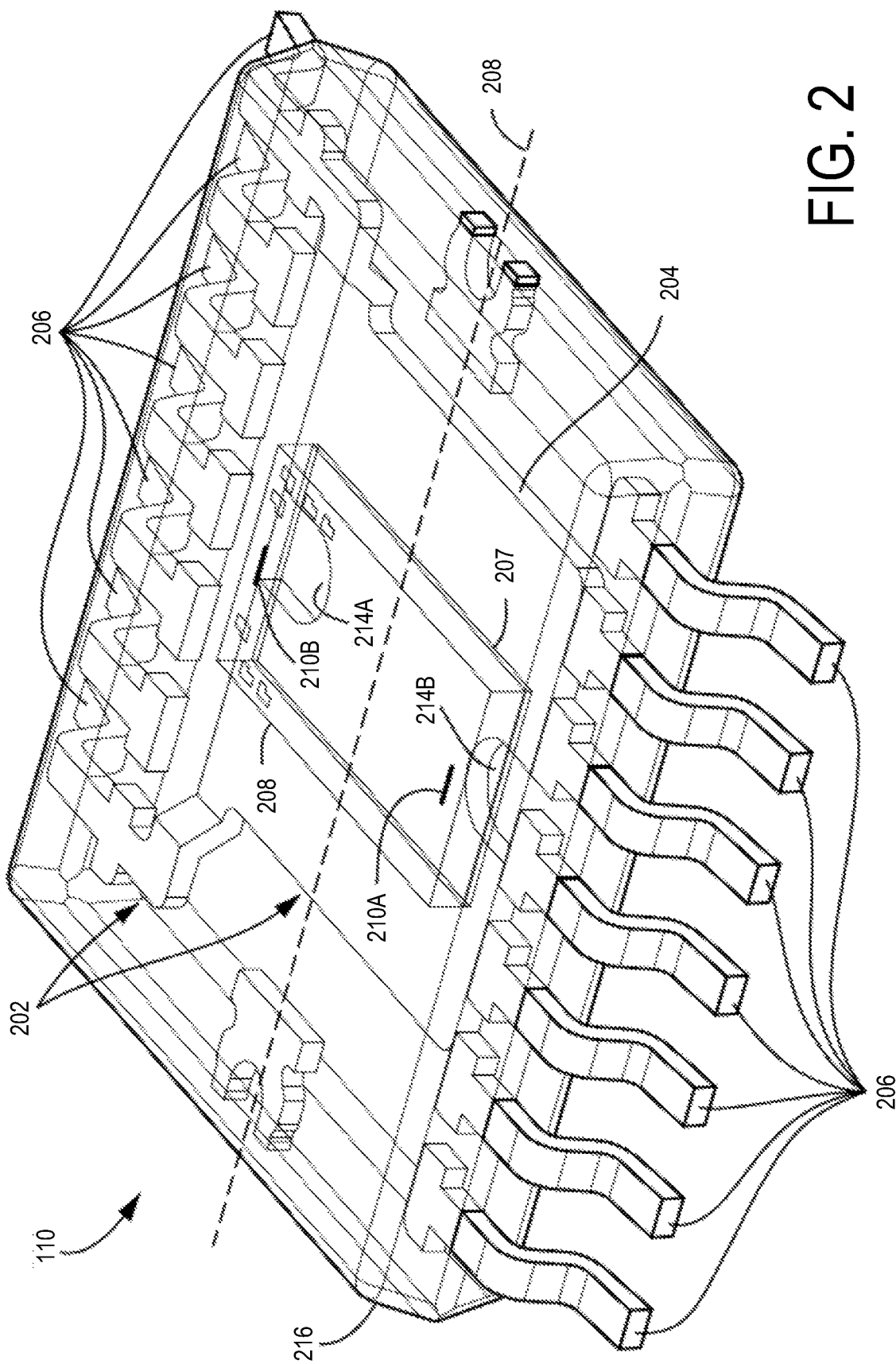
FIG. 2 is a diagram of an example of a current sensor, according to aspects of the disclosure.

FIG. 2 is a diagram of an example of a current sensor 110, according to aspects of the disclosure. As the numbering suggests, current sensor 110 may be the same or similar to any (or each) of the current sensors 110A-C, which are shown in FIG. 1. It will be understood that FIG. 2 is provided as an example only, and interface 106 is not limited to using any specific type of current sensor.

Features of current sensor 110 include a lead frame 202 and a die 208 supporting magnetic field sensing elements 210A and 210B. Lead frame 202 includes a die attach paddle 204 and a plurality of leads 206. Die 208 is attached to die attach paddle 204, as may be achieved with an adhesive layer 207. While a single semiconductor die 208 is shown, current sensor 110 can include more than one die, with each such die supporting magnetic field sensing element(s) and/or supporting circuitry. Additional features of the example current sensor 110 can include one or more cutouts, slits, slots or apertures 214A, 214B in the paddle 204 to reduce eddy currents and mold material 216 to enclose die attach paddle 204, die 208, magnetic field sensing elements 210A and 210B and portions of leads 206, shown. Aspects of current sensor 110 are shown and described in U.S. Pat. No. 10,481,181, entitled "Systems and Methods For Current Sensing" and issued on Nov. 19, 2019, which patent is hereby incorporated herein by reference in its entirety. In use, current sensor 110 is configured to be positioned proximate to a conductor, such as any of the conductors 108A-C, which are shown in the configuration of FIG. 1. Although in the example of FIG. 2, the sensor 110 includes two magnetic field sensing elements, alternative implementations are possible in which the sensor 110 includes only one magnetic field sensing element or more than two magnetic field sensing elements.

Figure 3:
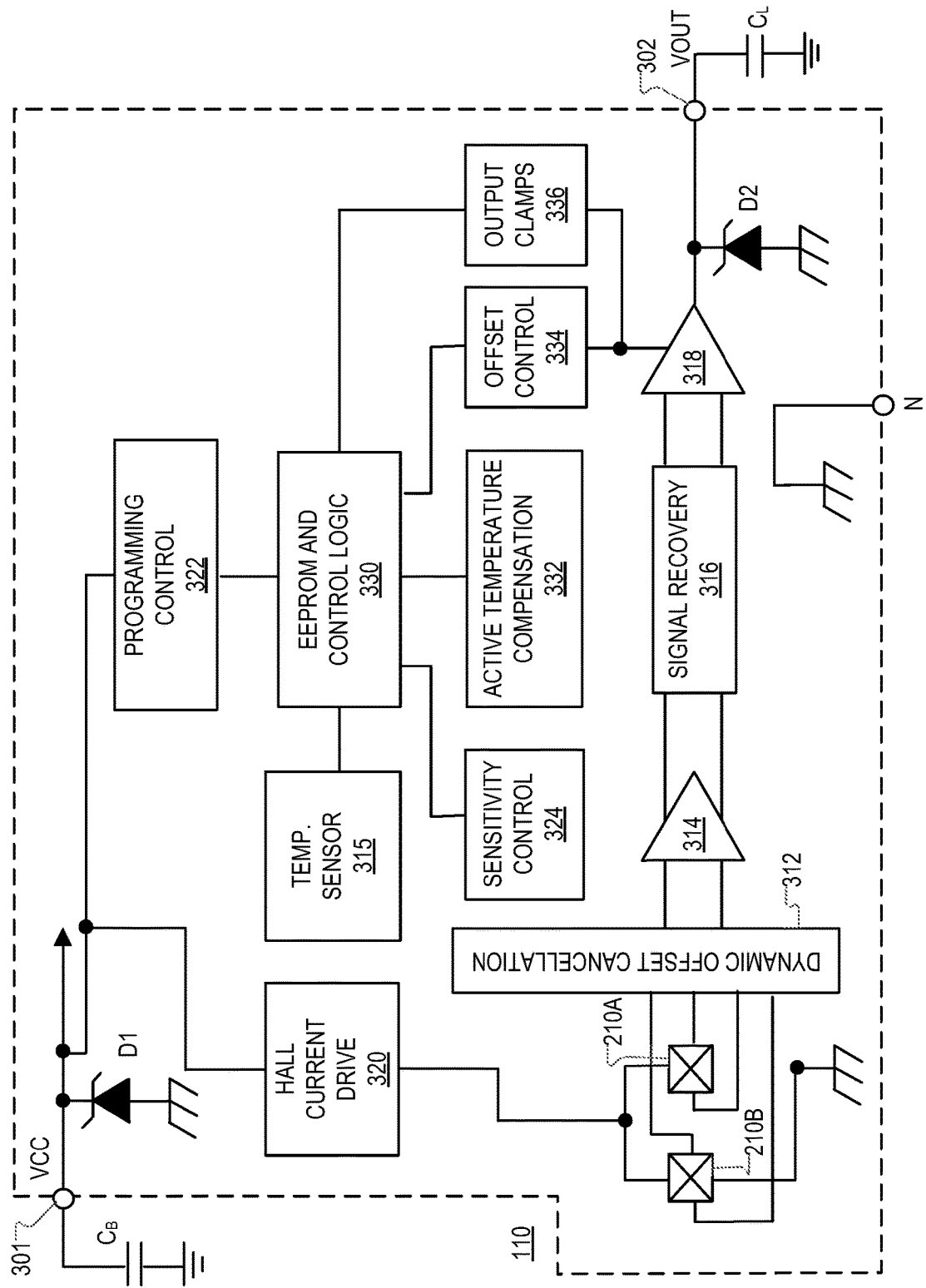
FIG. 3 is a diagram of an example of a current sensor, according to aspects of the disclosure.

FIG. 3 is a circuit diagram illustrating one possible implementation of the electronic circuitry of the sensor 110.

The sensor 110 may be configured to output a signal VOUT that is proportional to $\Delta B = B_R - B_L$ where $B_R$ represents magnetic field incident on one of the magnetic field sensing elements 210A-B and $B_L$ represents magnetic field incident on the other one of the magnetic field sensing elements 210A-B. The sensor output VOUT is also affected by the sensitivity, $\alpha$, of the signal path and can be represented as follows:

$$VOUT = \alpha \times \Delta B \quad (1)$$

The relationship between the conductor current to be measured and the differential field $\Delta B$ can be represented by a coupling coefficient, K(f) as follows:

$$\Delta B = K(f) \times I \quad (2)$$

It will be appreciated that coupling coefficient K(f) corresponds to coupling (e.g., transfer of energy, etc.) between a given current sensor and varies with frequency. As is discussed further below, the design of the conductors 108A-C helps reduce the variation of the coupling coefficient K(f) with respect to the frequency of the current that is being transmitted over conductors 108A-C.

The sensor 110 may include a VCC (supply voltage) pin 301, a VOUT (output signal) pin 302. The VCC pin 301 is used for the input power supply or supply voltage for current sensor 110. A bypass capacitor, $C_B$, can be coupled between the VCC pin 301 and ground. The VCC pin 301 can also be used for programming current sensor 110. The VOUT pin 302 is used for providing the output signal VOUT to circuits and systems (not shown) such as controller 101 (FIG. 1) and can also be used for programming. An output load capacitance $C_L$ is coupled between the VOUT pin 302 and ground. The example current sensor 110 can include a first diode D1 coupled between the VCC pin 301 and chassis ground and a second diode D2 coupled between the VOUT pin 302 and chassis ground.

The driver circuit 320 may be configured to drive the magnetic field sensing elements 210A and 210B. Magnetic field signals generated by the magnetic field sensing elements 210A and 210B are coupled to a dynamic offset cancellation circuit 312, which is further coupled to an amplifier 314. The amplifier 314 is configured to generate an amplified signal for coupling to the signal recovery circuit 316. Dynamic offset cancellation circuit 312 may take various forms including chopping circuitry and may function in conjunction with offset control circuit 334 to remove offset that can be associated with the magnetic field sensing elements 210A-B and/or the amplifier 314. For example, offset cancellation circuit 312 can include switches configurable to drive the magnetic field sensing elements (e.g., Hall plates) in two or more different directions such that selected drive and signal contact pairs are interchanged during each phase of the chopping clock signal and offset voltages of the different driving arrangements tend to cancel. A regulator (not shown) can be coupled between supply voltage VCC and ground and to the various components and sub-circuits of the sensor 110 to regulate the supply voltage.

A programming control circuit 322 is coupled between the VCC pin 301 and EEPROM and control logic circuit 330 to provide appropriate control to the EEPROM and control logic circuit. EEPROM and control logic circuit 330 determines any application-specific coding and can be erased and reprogrammed using a pulsed voltage. A sensitivity control circuit 324 can be coupled to the amplifier 314 to generate and provide a sensitivity control signal to the amplifier 314 to adjust a sensitivity and/or operating voltage of the amplifier 314. An active temperature compensation circuit 332 can be coupled to sensitivity control circuit 324, EEPROM and control logic circuit 330, and offset control circuit 334. The offset control circuit 334 can generate and provide an offset signal to a push/pull driver circuit 318 (which may be an amplifier) to adjust the sensitivity and/or operating voltage of the driver circuit 318. The active temperature compensation circuit 332 can acquire temperature data from EEPROM and control logic circuit 330 via a temperature sensor 315 and perform necessary calculations to compensate for changes in temperature, if needed. Output clamps circuit 336 can be coupled between the EEPROM and control logic circuit 330 and the driver circuit 318 to limit the output voltage and for diagnostic purposes.

FIGS. 4A-D show an example of one possible implementation of conductor 108A, according to aspects of the disclosure. Although FIGS. 4A-D show an example of conductor 108A, it will be understood that each of conductors 108B-C (shown in FIG. 1) may have the same or similar configuration.

As illustrated, conductor 108A may include edges 411, 413, 421, 423, and primary surfaces 407 and 409. Furthermore, conductor 108A may have side portions 412 and 414, and a the central portion 416. Formed in central portion 416 may be a through-hole 406, as well as notches 402 and 404. Each of notches 402 and 404 may be a void that is formed by cutting out (or stamping out) material used to form conductor 108A. As such, notches 402 and 404 may extend all the way through the entire thickness of conductor 108A. Through-hole 406, together with notches 402 and 404, may define legs 403 and 405 of conductor 108A (shown in FIG. 4A). Each of legs 403 and 405 may have a smaller width than portions 412 and 414 of conductor 108A. Because they have a smaller width, legs 403 and 405 may experience higher current density than portions 412 and 414 when electrical current flows through conductor 108A. The higher current density may increase the accuracy of measurements taken by sensor 110A when sensor 110A is positioned inside through-hole 406 and adjacent to legs 403 and 405.

Figure 4A:
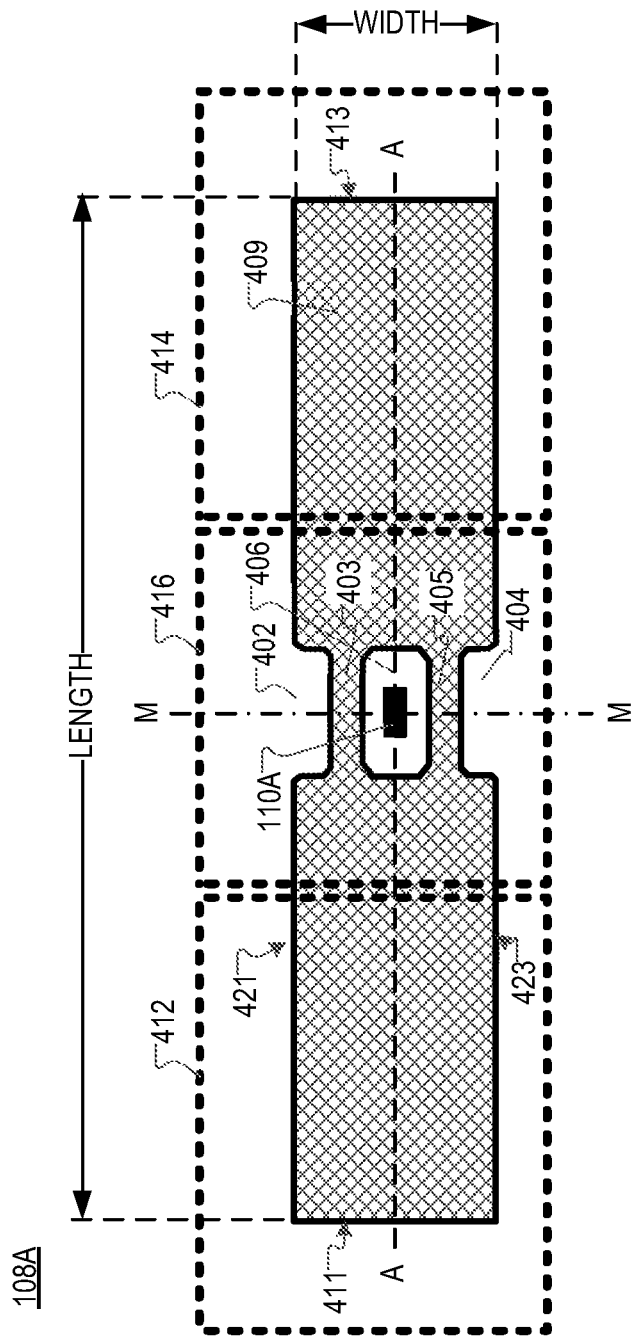
FIG. 4A is a planar top-down view of an example of a conductor, according to aspects of the disclosure.
Figure 4B:
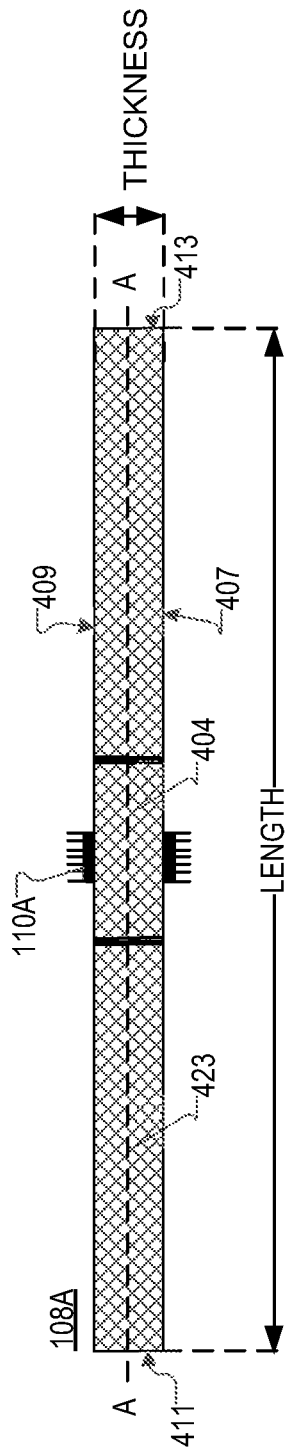
FIG. 4B is a planar side view of the conductor of FIG. 4A, according to aspects of the disclosure.
Figure 4C:
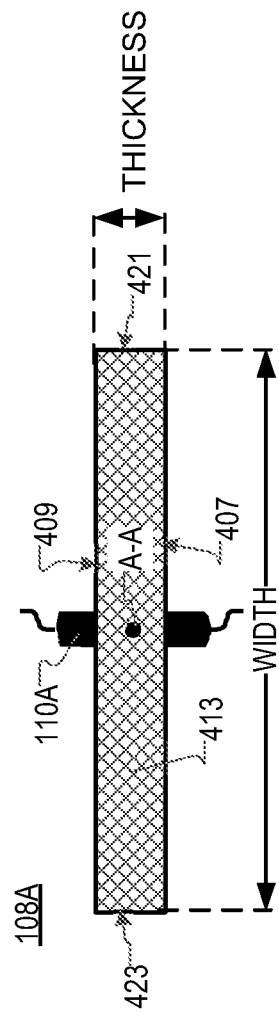
FIG. 4C is a planar side view of the conductor of FIG. 4A, according to aspects of the disclosure.

Through-hole 406 may be centered on an axis M-M (shown in FIG. 4A). According to the present example, axis M-M runs through the middle of each of notches 402 and 404. However, alternative implementations are possible in which at least one of notches 402 and 404 is offset from axis M-M along the length of conductor 108A. Furthermore, alternative implementations are possible in which notches 402 and 404 are offset in opposite directions from axis M-M. For example, one of notches 402 and 404 may be to the left of axis M-M and the other one may be to the right of axis M-M. Although, in the present example, conductor 108A includes both of notches 402 and 404, alternative implementations are possible in which one or both of notches 402 and 404 is omitted (or not provided in conductor 108A). In such implementations, conductor 108A may include only notch 402, while lacking a notch on the opposite side of through-hole 406.

Figure 4E:
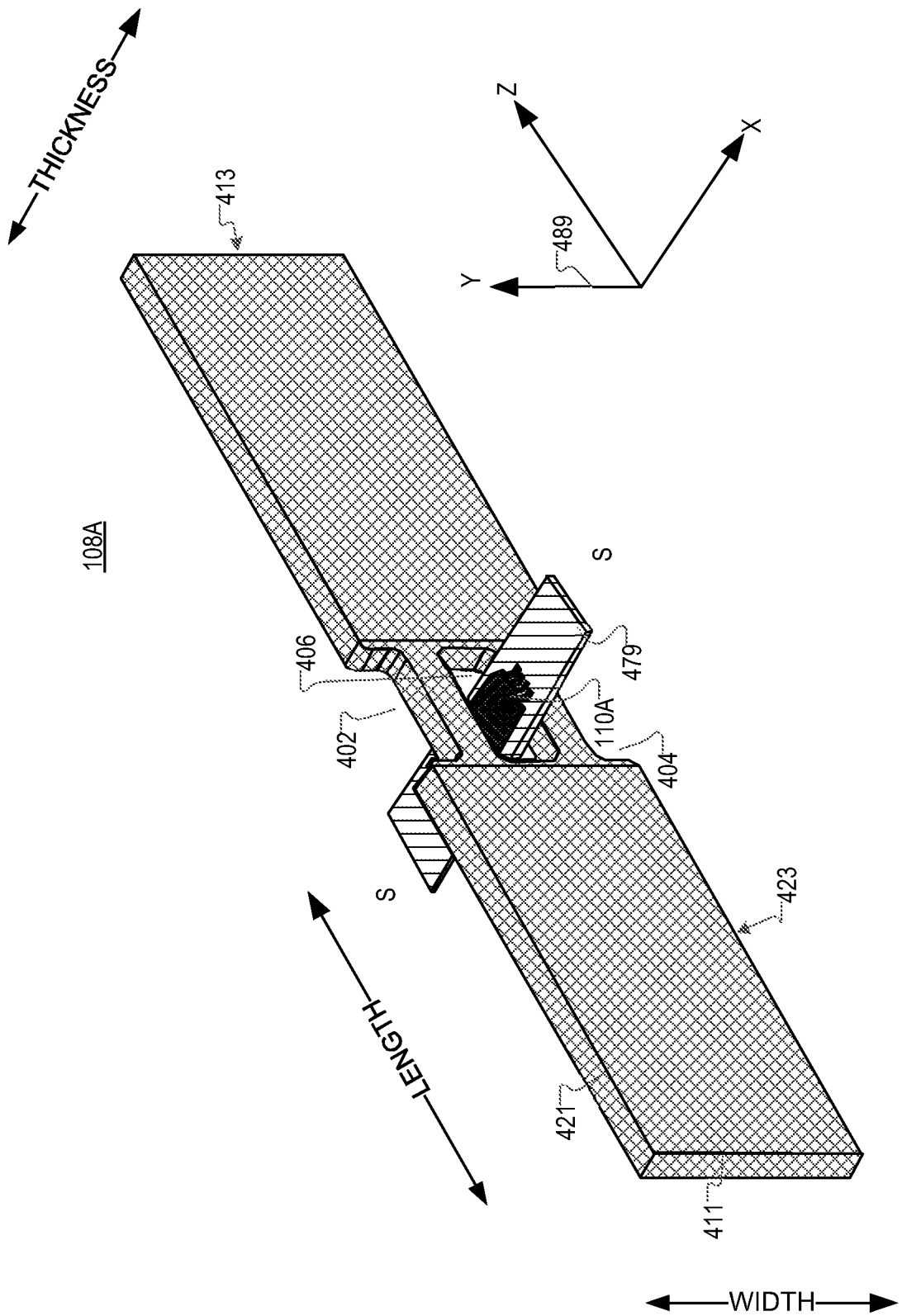
FIG. 4E is a perspective view of the conductor of FIG. 4A, according to aspects of the disclosure.
Figure 4G:
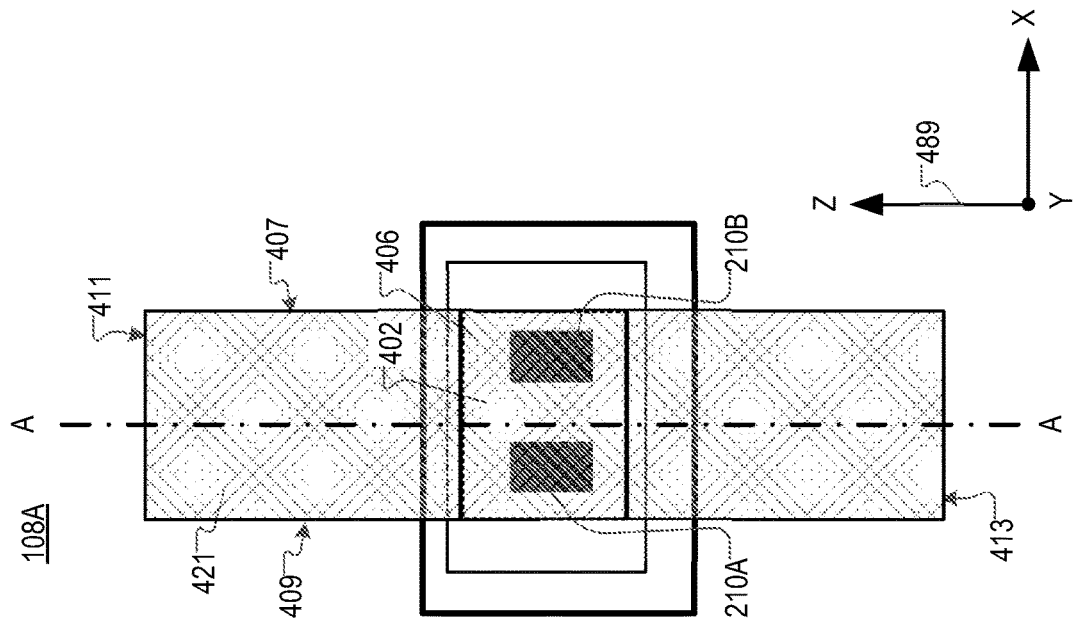
FIG. 4G is a diagram illustrating aspects of the system of FIG. 4E, according to aspects of the disclosure.
Figure 4F:
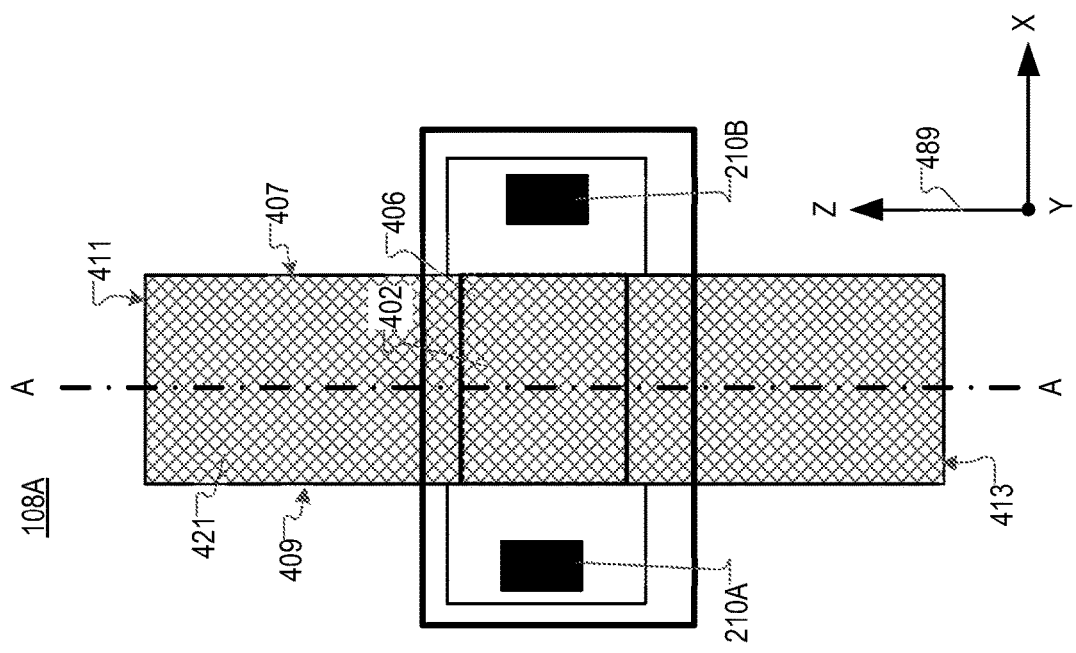
FIG. 4F is a diagram illustrating aspects of the system of FIG. 4E, according to aspects of the disclosure.

Current sensor 110A may be disposed in through-hole 406, as shown. As illustrated in FIG. 4E, current sensor 110A may be mounted on a printed circuit board (PCB) 479, and PCB 479 may be inserted in through-hole 406 in such a way so as to position current sensor 110A inside through-hole 406, and above or below notches 404 and 402. With regard to the exact placement of current sensor 110A, FIG. 4F shows that, in one implementation, current sensor 110B may be disposed inside through-hole 406 in such a way that sensing elements 210A and 210B are situated outside of through-hole 406 on opposite sides of conductor 108A. FIG. 4G shows that in other implementations, current sensor 110A may be disposed inside through-hole 406 in such a way that sensing elements 210A and 210B are disposed inside through-hole 406 and sit on opposite sides of a central longitudinal axis A-A of conductor 108A. Moreover, alternative implementations are possible in which one of sensing elements 210A-B is situated outside of through-hole 406, and the other is situated inside through-hole 406, while, at the same time, they are situated on opposite sides of central longitudinal axis A-A.

In the examples of FIGS. 4F-G, sensing elements 210A and 210B each have an axis of maximum sensitivity that extends substantially in parallel with the X-axis of coordinate system 489. Central longitudinal axis A-A extends substantially in parallel with the Z-axis of coordinate system 489. In some implementations, central longitudinal axis A-A may extend substantially in parallel with edges 421 and 423, as well as primary surfaces 407 and 409. Additionally or alternatively, in some implementations, central longitudinal axis A-A may intersect edges 411 and 413 through their respective centers. Additionally or alternatively, in some implementations, central longitudinal axis A-A may bisect through-hole 406 in two equal halves. Additionally or alternatively, in some implementations, central longitudinal axis A-A may be equidistant from primary surfaces 407 and 409. Additionally or alternatively, in some implementations, central longitudinal axis A-A may be equidistant from edges 421 and 423. Additionally or alternatively, in some implementations, the respective axis of maximum sensitivity (and/or pinning direction) of each of sensing elements 210A and 210B may be substantially perpendicular to the central longitudinal axis A-A. Additionally or alternatively, in some implementations, the distance between magnetic field sensing element 210A and central longitudinal axis A-A may be substantially the same as the distance between magnetic field sensing element 210B and central longitudinal axis A-A. As used herein, the phrase "substantially parallel" or "substantially in parallel" shall mean "within =10 degrees of being exactly parallel". As used herein, the phrase "substantially perpendicular" shall mean "within ±10 degrees of being exactly perpendicular". As used herein, the phrase "a first distance is substantially equal to a second distance" shall mean that the length of the first distance is within ±10% of the length of the second distance. The X, Y, and Z axes of coordinate system 489 are perpendicular to each other in the example of FIGS. 4A-H.

Figure 4H:
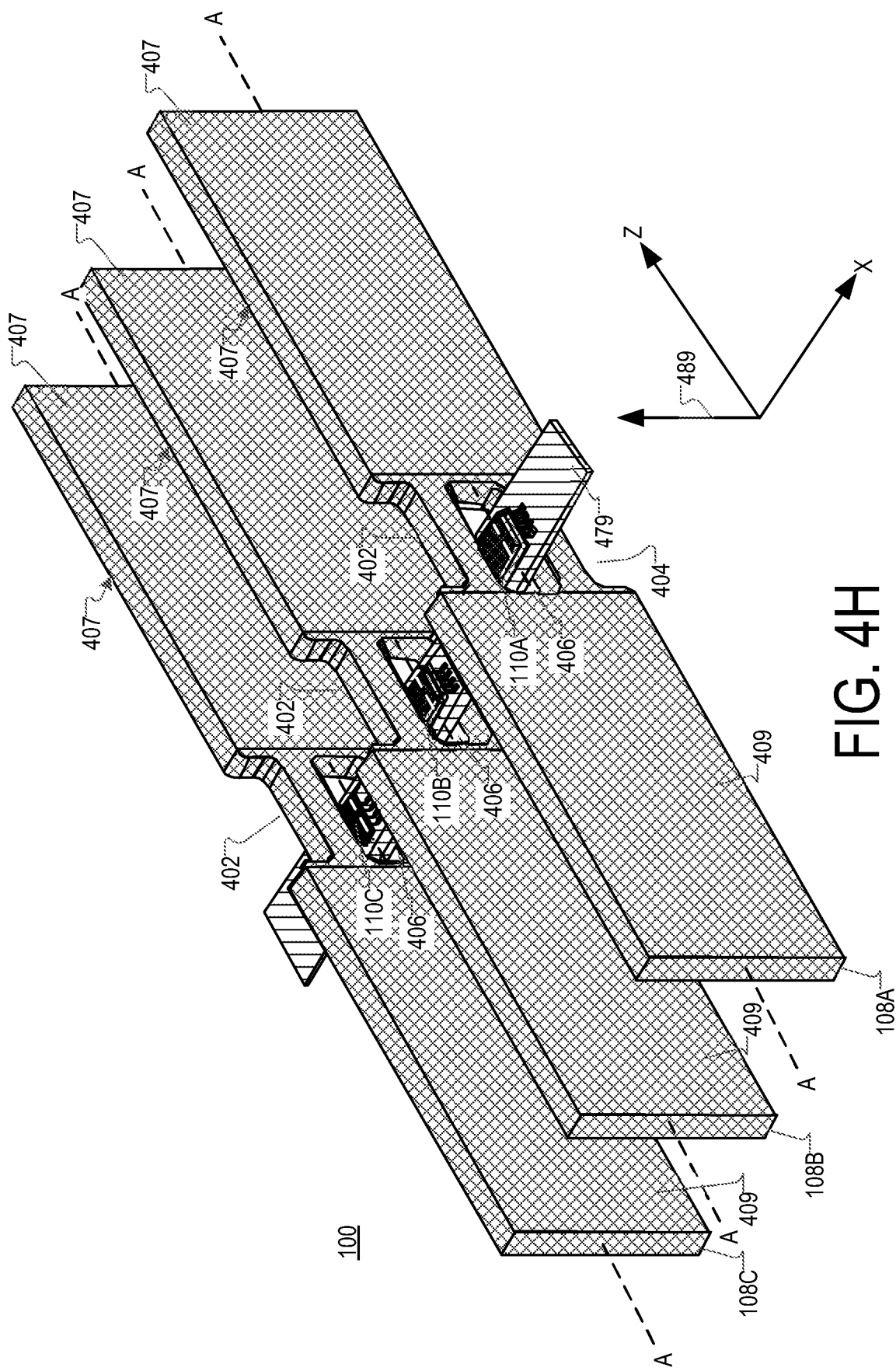
FIG. 4H is a diagram of an example of a system, according to aspects of the disclosure.

FIG. 4H is a diagram of system 100, according to aspects of the disclosure. According to the example of FIG. 4H, each of conductors 108B and 108C has a respective configuration that is identical to that of conductor 108A. Accordingly, conductors 108B and 108C may each have a respective central longitudinal axis A-A, a respective through-hole 406, respective notches 402-404, and respective primary surfaces 407 and 409. According to the example of FIG. 4H, sensors 110A, 110B, and 110B are mounted on PCB 479 and PCB 479 is inserted in the respective through 406 of each of conductors 108A-C. According to the present example, the respective primary surfaces 407 of the conductors 108A-C are substantially parallel with each other, and the respective primary surfaces 409 of conductors 108A-C are also substantially parallel with other. Similarly, the respective longitudinal axis A-A of each of conductors 108A-C is substantially parallel to the respective longitudinal axes A-A of the remaining ones of conductors 108A-C. The respective longitudinal axis A-A of each of conductors 108A-C may extend substantially in parallel with the Z-axis of coordinate system 489.

As illustrated, sensor 110A may be disposed inside the through-hole 406 of conductor 108A, sensor 110B may be disposed inside the through-hole 406 of conductor 108B, and sensor 110C may be disposed inside the through-hole 406 of conductor 108C. The magnetic field sensing elements of sensor 110A may be positioned relative to conductor 108A as discussed above with respect to FIGS. 4F-G. In other words, the magnetic field sensing elements of sensor 110A may be positioned on opposite sides of central longitudinal axis A-A of conductor 108A and/or on opposite sides of conductor 108A. The magnetic field sensing elements of sensor 110B may be positioned relative to the conductor 108B as discussed above with respect to FIGS. 4F-G. In other words, the magnetic field sensing elements of sensor 110B may be positioned on opposite sides of central longitudinal axis A-A of conductor 108B and/or on opposite sides of conductor 108B. The magnetic field sensing elements of sensor 110C may be positioned relative to the conductor 108C as discussed above with respect to FIGS. 4F-G. In other words, the magnetic field sensing elements of sensor 110C may be positioned on opposite sides of central longitudinal axis A-A of conductor 108C and/or on opposite sides of conductor 108C.

In some implementations, the respective sensing elements 210A-B of each of sensors 110A-C may have an axis of maximum sensitivity that is substantially perpendicular to the central longitudinal axis A-A of the conductor inside whose through-hole 406 the sensor is positioned. In other words, the axes of maximum sensitivity of the magnetic field sensing elements in sensor 110A may be substantially perpendicular to the central longitudinal axes A-A of conductors 110B-C; the axes of maximum sensitivity of the magnetic field sensing elements in sensor 110B may be substantially perpendicular to the central longitudinal axes A-A of conductors 108A and 108C; and the axes of maximum sensitivity of the magnetic field sensing elements in sensor 110C may be perpendicular to the central longitudinal axes A-A of conductors 108A-B.

In another aspects, each of the sensing elements 201A-B in sensors 110A-C may be aligned with primary surfaces of neighboring conductors. For example, sensing elements 210A-B in sensor 110A may have axes of maximum sensitivity that are substantially perpendicular to the primary surfaces 407 and 409 of each of conductors 108B-C. Sensing elements 210A-B in sensor 110B may have axes of maximum sensitivity that are substantially perpendicular to the primary surfaces 407 and 409 of each of conductors 108A and 108C. Sensing elements 210A-B in sensor 110C may have axes of maximum sensitivity that are substantially perpendicular to the primary surfaces 407 and 409 of each of conductors 108-B. In one respect, the arrangement shown in FIG. 4H is advantageous because it reduces crosstalk in neighboring conductors.

Figure 5:
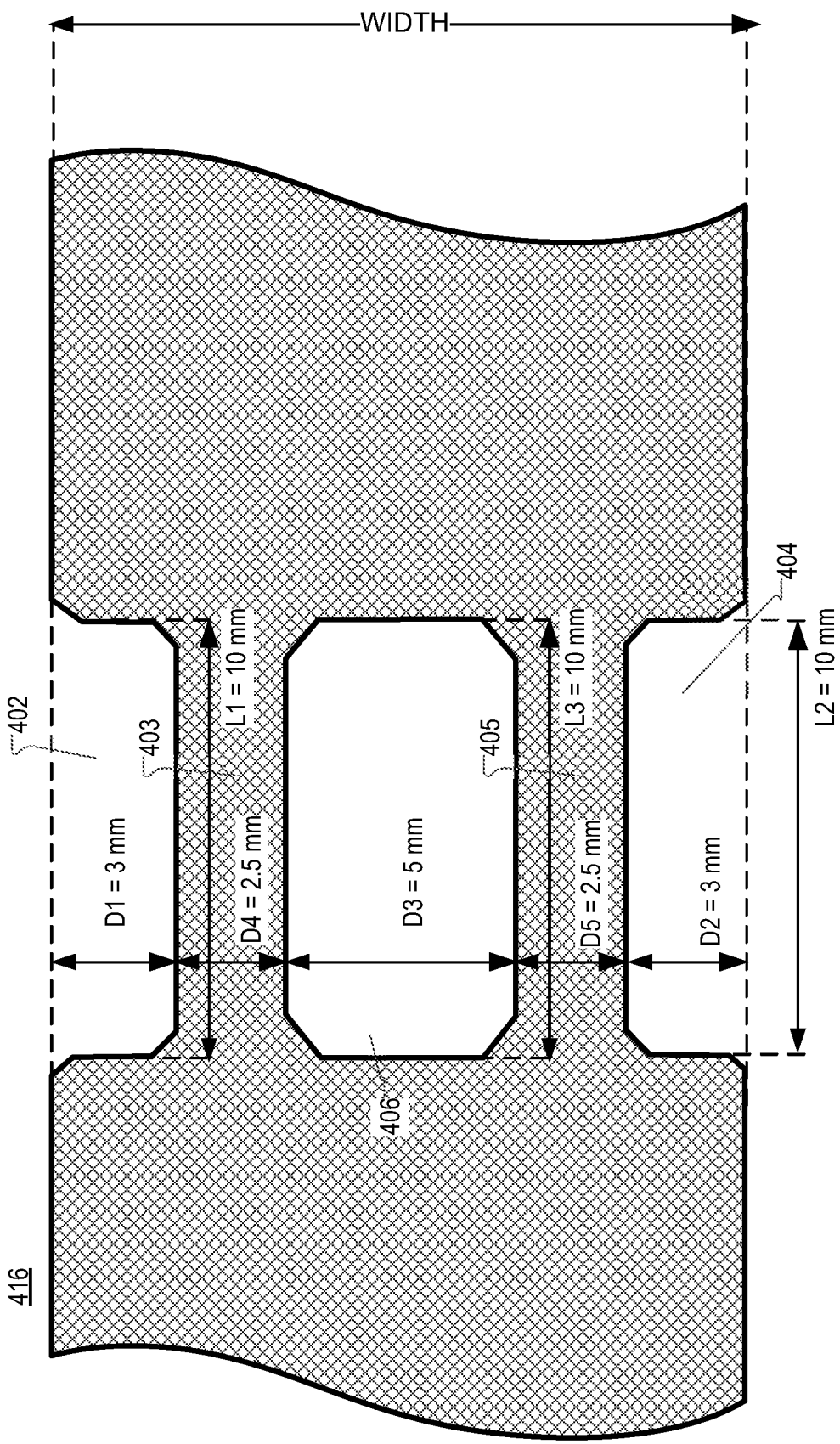
FIG. 5 is a diagram illustrating an example of a preferred implementation of the conductor of FIG. 4A, according to aspects of the disclosure.

FIG. 5 is a partial view of the central portion 416 of conductor 108A, in accordance with a preferred implementation. FIG. 5 is provided to illustrate a set of dimensions that have been determined to perform particularly well when used with a signal having a current level in the range of 1-1000 amps and a frequency in the range of 1 Hz-10 kHz running through conductor 108A. As illustrated, in the preferred implementation, notch 402 has a width D1=3 mm, notch 404 has a width D2=3 mm, through-hole 406 has a width D3=5 mm, leg 403 has a width D4=2.5 mm and leg 405 has a width D5=2.5 mm. According to the preferred implementation, notch 402 has a length L1=10 mm, notch 404 has a length L2=10 mm, and through-hole 406 has a length L3=10 mm. According to the preferred implementation, the thickness of conductor 108A (shown in FIGS. 4B-C) is 2 mm, and the length of conductor 108A (shown in FIG. 4A) is 16 mm. It will be understood that the values for dimensions, current levels, and frequencies are provided as an example only, and the present disclosure is not limited to these values.

As discussed further below with respect to FIGS. 6-7A-B, according to the present disclosure, it has been determined that the preferred set of dimensions delivers superior performance over other possible implementations of conductor 108A that feature different through-hole width D3 (as well as different leg widths D4 and D5). However, it will be understood that the present disclosure is not limited to the set of dimensions shown in FIG. 5. For example, in some implementations, the widths D1, D2, and D3 may have any suitable value. Furthermore, in some implementations, the widths D1 and D2 may have different values. Although, in the preferred implementation, the width D3 is the same as the widths D1 and D2, in an alternative implementation, the width D3 may be smaller or greater than at least one of the widths D1 and D2. Furthermore, in some implementations, the widths D4 and D5 of legs 403 and 405, respectively, may have any suitable value. Although, in the preferred implementation, legs 403 and 405 have the same width, alternative implementations are possible in which they have different widths. Although, in the preferred implementation, the lengths L1, L2, and L3 have the same value, alternative implementations are possible in which the lengths L1, L2, and L3 have different values. For example, in one implementation, length L1 of notch 402 may be smaller or greater than length L2 of notch 404. Additionally or alternatively, in some implementations, the length L3 of through-hole 406 may be smaller (or greater) than one or both of lengths L1 and L2.

It will be understood that the dimensions of the preferred implementation that are provided with respect to FIG. 5 can vary by ±15%. In this regard, as used throughout the disclosure, the phrase "element A has a length of approximately B mm" shall mean that the length of element A is within ±15% from B. Similarly, as used throughout the disclosure, the phrase "element C has a width of approximately D mm" shall mean that the width of element C is within ±15% from D.

Figure 6:
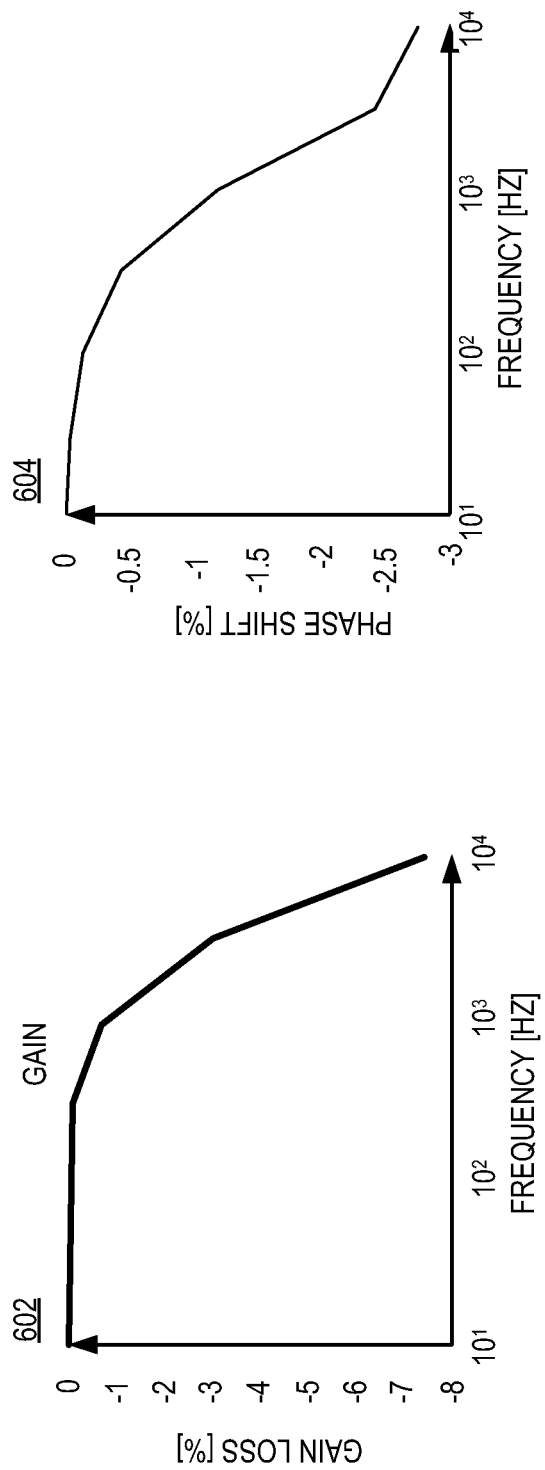
FIG. 6 is a graph illustrating aspects of the operation of the conductor of FIG. 4A, according to aspects of the disclosure.

FIG. 6 shows a graph 602 illustrating the amount of gain loss that is imparted by the preferred implementation of conductor 108A (shown in FIG. 5) on signals that are transmitted through conductor 108A. Graph 602 shows that the preferred implementation of conductor 108A may exhibit a gain loss of close to 0% for signals having a frequency of up to 750-1000 Hz. FIG. 6 further shows a graph 604 illustrating the amount of phase shift that is imparted by the preferred implementation of conductor 108A (shown in FIG. 5) on signals that are transmitted through conductor 108A. Graph 604 shows that the preferred implementation of conductor 108A may exhibit a frequency shift of close to 0% for signals having a frequency of up to 750-1000 Hz.

Figure 7A:
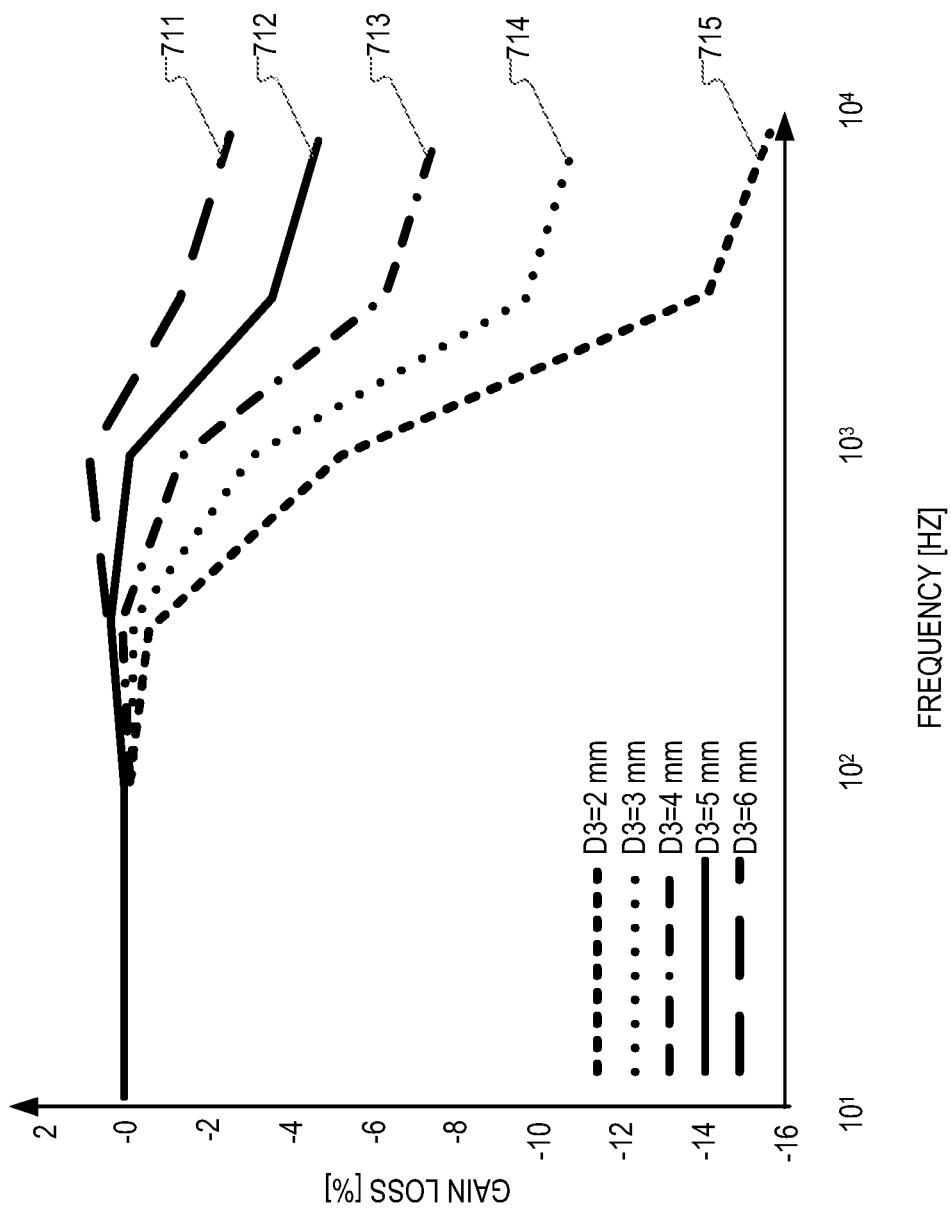
FIG. 7A is a graph illustrating aspects of the operation of the conductor of FIG. 4A, according to aspects of the disclosure.
Figure 8C:
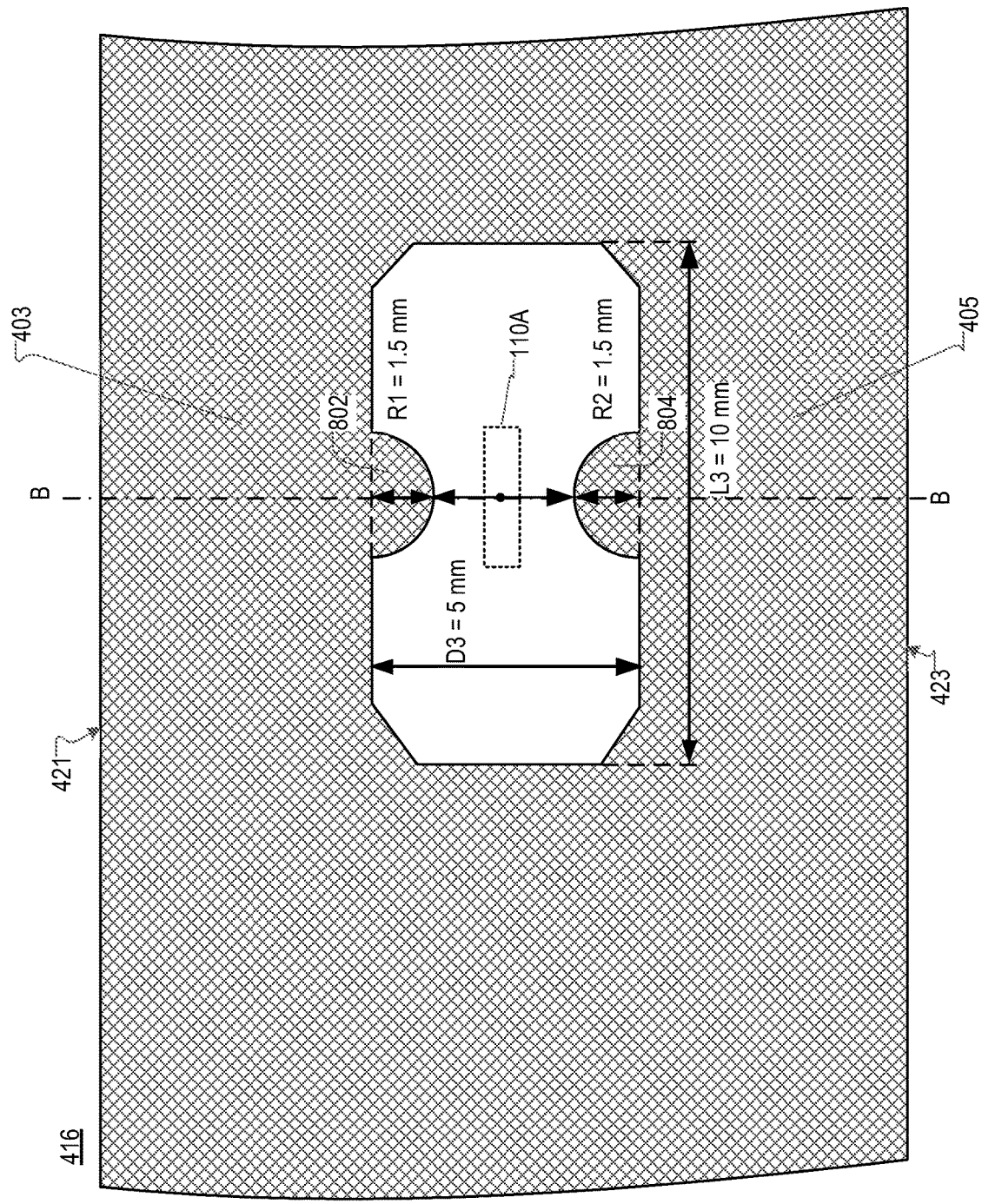
FIG. 8C is a partial top-down view of the conductor of FIG. 8A, according to aspects of the disclosure.

FIG. 7A shows a graph illustrating how the preferred implementation of conductor 108A (shown in FIG. 5) compares to other implementations of conductor 108A. Specifically, FIG. 7A illustrates the gain loss imparted by different implementations of conductor 108A on signals that are transmitted through those implementations. Each of the implementations of conductor D3 that are concerned by FIG. 7A has a different width D3 of the through-hole 406. The implementations of conductor 108A, which are discussed with respect to FIG. 7A all have the configuration that is discussed with respect to FIGS. 4A-H, but they may differ in the dimensions of through-hole 406 and/or legs 403 and 405. In other words, FIG. 7A does not apply to the configuration of conductor 108A that is shown in FIGS. 8A-C.

The graph of FIG. 7A includes curves 711-715. Curve 711 corresponds to an implementation of conductor 108A in which through-hole 406 has a width D3=6 mm. Curve 712 corresponds to an implementation of conductor 108A in which through-hole 406 has a width D3=5 mm. Curve 713 corresponds to an implementation of conductor 108A in which through-hole 406 has a width D3=4 mm. Curve 714 corresponds to the preferred implementation of conductor 108A (shown in FIG. 5) in which through-hole 406 has a width D3=3 mm. Curve 715 corresponds to an implementation of conductor 108A in which through-hole 406 has a width D3=2 mm. Apart from the implementations associated which curves 711-715 having different through-hole widths (and by implication different widths D4 and D5 for legs 403 and 405), the dimensions of notches 402 and 404 in each of the implementations of conductor 108A are the same as the dimensions discussed above with respect to FIG. 5. All of the implementations have the same thickness (2 mm).

In one aspect, FIG. 7A illustrates that the preferred implementation of conductor 108A performs better than the remaining ones of the plurality of implementations. Specifically, FIG. 7A illustrates that the gain loss imparted by the preferred implementation of conductor 108A is substantially closer to 0% than any of the remaining ones of the plurality of implementations of conductor 108A which correspond to curves 715, 713, 712, and 711.

Figure 7B:
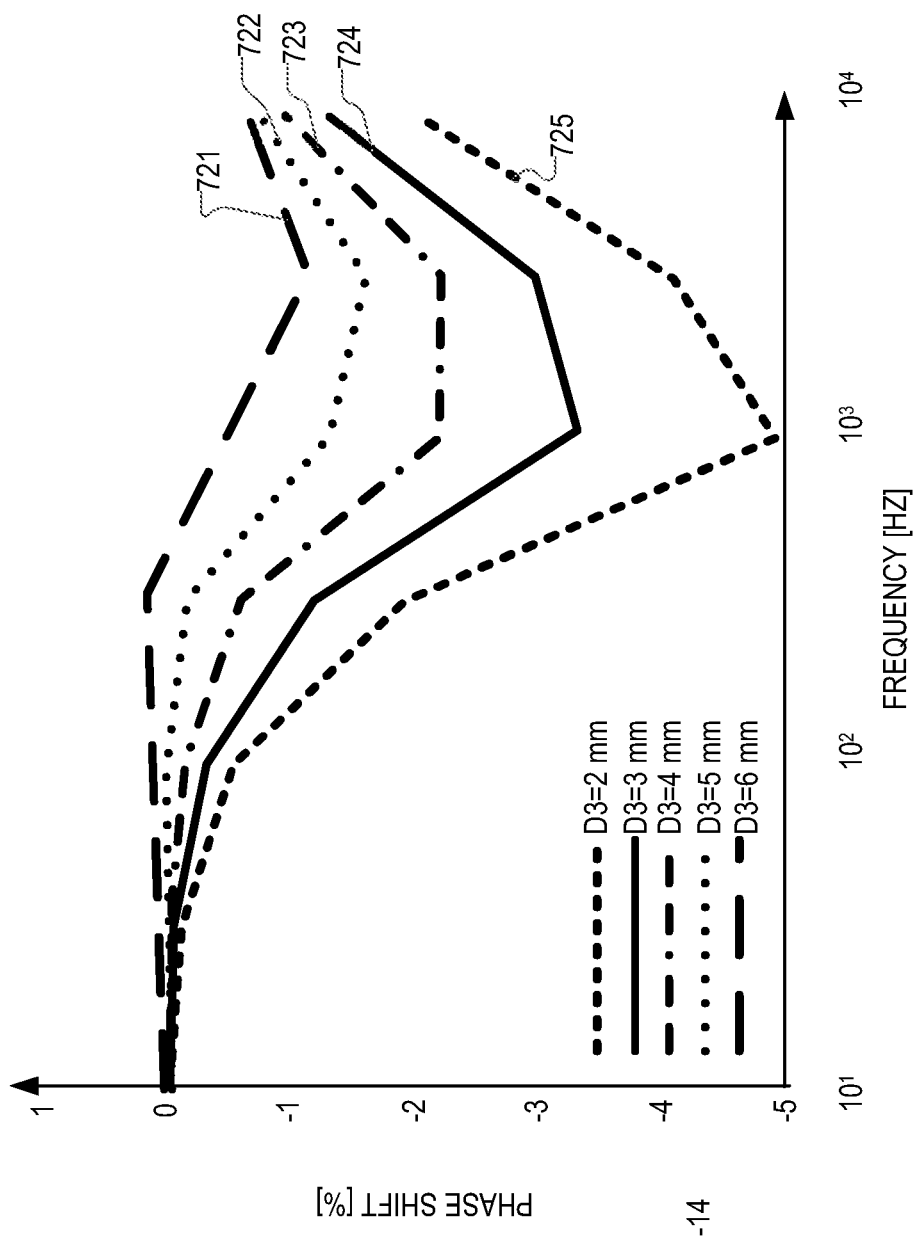
FIG. 7B is a graph illustrating aspects of the operation of the conductor of FIG. 4A, according to aspects of the disclosure.

FIG. 7B illustrates how the preferred implementation of conductor 108A (shown in FIG. 5) compares to other implementations of conductor 108A. Specifically, FIG. 7B illustrates the frequency shift imparted by different implementations of conductor 108A on signals that are transmitted through those implementations. Each of the implementations of conductor D3 that are concerned by FIG. 7B has a different width D3 of the through-hole 406. The implementations of conductor 108A, which are discussed with respect to FIG. 7B all have the configuration that is discussed with respect to FIGS. 4A-H, but they may differ in the dimensions of through-hole 406 and/or legs 403 and 405. In other words, FIG. 7B does not apply to the configuration of conductor 108A that is shown in FIGS. 8A-C.

The graph of FIG. 7B includes curves 721-725. Curve 721 corresponds to an implementation of conductor 108A in which through-hole 406 has a width D3=6 mm. Curve 722 corresponds to an implementation of conductor 108A in which through-hole 406 has a width D3=5 mm. Curve 723 corresponds to an implementation of conductor 108A in which through-hole 406 has a width D3=4 mm. Curve 724 corresponds to the preferred implementation of conductor 108A (shown in FIG. 5) in which through-hole 406 has a width D3=3 mm. Curve 725 corresponds to an implementation of conductor 108A in which through-hole 406 has a width D3=2 mm. Apart from the implementations associated which curves 721-725 having different through-hole widths (and by implication different widths D4 and D5 for legs 403 and 405), the dimensions of notches 402 and 404 in each of the implementations of conductor 108A are the same as the dimensions discussed above with respect to FIG. 5. All of the implementations have the same thickness (2 mm).

In one aspect, FIG. 7B illustrates that the preferred implementation of conductor 108A performs better than the remaining ones of the plurality of implementations. Specifically, FIG. 7B illustrates that the frequency shift imparted by the preferred implementation of conductor 108A is substantially closer to 0% than any of the implementations corresponding to curves 721, 722, 723, and 725. In another aspect, FIGS. 7A-B illustrate that setting the width of through-hole 406 to any value in the range of 3.1-3.9 mm could also yield a comparatively high performance of conductor 108A.

Some conventional conductor implementations may use an off-centered through-hole to ensure a flat frequency response. In AC applications the crosstalk error of such conventional implementations is as high as 3% at a frequency of 1 kHz. By contrast, the preferred implementation of conductor 108, which features a centered through-hole reduces the crosstalk error to ~0.5% at both low and high frequencies. FIG. 7C shows a graph illustrating the difference in crosstalk error between conventional implementations of a conductor, which feature an off-center through-hole and the preferred implementation of conductor 108A.

FIGS. 8A-C show an example of conductor 108A, in accordance with another implementation. It will be understood that the implementation shown in FIGS. 8A-C may replace the implementation of conductors 108A-C that is used in the example of FIG. 4H. In this regard, it will be understood that in some implementations, each of the conductors 108A-C that are shown in FIG. 4H may be configured as discussed further below with respect to FIGS. 8A-C.

In the example of FIGS. 8A-C, notches 402 and 404 are omitted from conductor 108A, which may cause legs 403 and 405 to have a greater width than in the example of FIGS. 4A-5. Protrusions 802 and 804 may extend from legs 403 and 405, respectively. Each of protrusions 802 and 804 may be shaped as a half-circle. Each of protrusions 802 and 804 may be centered on an axis B-B that is perpendicular to edges 421 and 423. Sensor 110A may also be centered on axis B-B. Sensor 110A may be equidistant from protrusions 802 and 804. According to the present disclosure, it has been determined that providing conductor 108A with round protrusions 802 and 804 results in an improved frequency response of conductor 108A.

In one implementation, through-hole 406 has a width D3=5 mm, through-hole 406 has a length L3=10 mm, protrusion 802 has a radius R1=1.5 mm, and protrusion 804 has a radius R2=1.5 mm. Although, in the example of FIGS. 8A-C, protrusions 802 and 804 have the same radius, alternative implementations are possible in which they have different radii. It will be understood that the present disclosure is not limited to any specific size for each of protrusions 802 and 804. Moreover, in some implementations, one of protrusions 802 and 804 may be larger than the other.

According to the present example, each of protrusions 802 and 804 is shaped as a half-circle. However, the present disclosure is not limited to protrusions 802 and 804 having any specific shape. For example, in some implementations, protrusions 802 and 804 may each have a round shape (e.g., an oval shape) and/or a rectangular shape. Although, in the example of FIGS. 8A-C, protrusions 802 and 804 have the same shape, alternative implementations are possible in which they have different shapes. For example, protrusion 802 may have a circular shape and protrusion 804 may have an ellipsoid shape. Although, in the example of FIGS. 8A-C, sensor 110A is equidistant from protrusions 802 and 804, alternative implementations are possible in which sensor 110A is situated closer to one of protrusions 802 and 804 than to the other. Although, in the example of FIGS. 8A-C, notches 402 and 404 are omitted from conductor 108A, alternative implementations are possible in which notches 402 and 404 are provided adjacent to protrusions 802 and 804, respectively.

According to the example of FIGS. 8A-C, axis B-B runs through the middle of through-hole 406, and sensor 110A is centered with through-hole 406. However, alternative implementations are possible in which sensor 110 is off-center relative to through-hole 406. Although, in the example of FIGS. 8A-C, legs 403 and 405 have the same width, alternative implementations are possible in which they have different widths. In such implementations, through-hole 406 may be closer to one of edges 421 and 423 than to the other.

The concepts and ideas described herein may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, or volatile memory. The term unit (e.g., a addition unit, a multiplication unit, etc.), as used throughout the disclosure may refer to hardware (e.g., an electronic circuit) that is configured to perform a function (e.g., addition or multiplication, etc.), software that is executed by at least one processor, and configured to perform the function, or a combination of hardware and software.

As used herein, the term "magnetic-field sensing element" is used to describe a variety of electronic elements that can sense a magnetic field. The magnetic-field sensing element can be, but is not limited to, a Hall Effect element a magnetoresistance element, a magnetotransistor or an inductive coil. As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

The invention claimed is:

1. A system, comprising:
a first conductor having a pair of first primary surfaces, the first conductor including a first through-hole formed therein, the first conductor including a first notch and a second notch that are formed on opposite sides of the first through-hole; and
a printed circuit board that is inserted in the first through-hole, the printed circuit board having a first current sensor mounted thereon, the first current sensor being disposed inside the first through-hole,
wherein the first current sensor and the first notch are disposed on an alignment axis that is transverse to a length of the first conductor, and the second notch is offset from the alignment axis along the length of the first conductor.

2. The system of claim 1, wherein:
the first conductor has a thickness of approximately 2 mm,
the first through-hole has a width of approximately 3 mm, and
the first and second notches each have a respective width of approximately 3 mm.

3. The system of claim 1, wherein the first through-hole has a width in the range of 2.1-3.9 mm.

4. The system of claim 1, wherein the first through-hole and the first notch are arranged to define a narrow segment of the first conductor that has a width of approximately 2.5 mm.

5. The system of claim 1, wherein the first current sensor includes at least two magnetic field sensing elements and the first current sensor is configured so that the magnetic field sensing elements are situated outside of the first through-hole, and on opposite sides of the first conductor.

6. The system of claim 1, wherein the first current sensor includes at least two magnetic field sensing elements that are disposed inside the first through-hole, and on opposite sides of a central longitudinal axis of the first conductor.

7. The system of claim 1, wherein the first current sensor includes at least two magnetic field sensing elements, each of the magnetic field sensing elements including at least one of a Hall plate, a giant magnetoresistance (GMR) element, a spin valve, an anisotropic magnetoresistance element (AMR), a tunneling magnetoresistance (TMR) element, and a magnetic tunnel junction (MTJ).

8. The system of claim 1, further comprising a second conductor having a pair of second primary surfaces, the second conductor including a second through-hole formed therein, wherein the printed circuit board includes a second current sensor that is mounted thereon, the printed circuit board is inserted in the second through-hole, such that the second current sensor is disposed inside the second through-hole.

9. The system of claim 8, wherein the first current sensor includes at least two first magnetic field sensing elements having respective axes of maximum sensitivity that are substantially perpendicular to the second primary surfaces of the second conductor, and the second current sensor includes at least two second magnetic field sensing elements having respective axes of maximum sensitivity that are substantially perpendicular to the first primary surfaces of the first conductor.

10. The system of claim 8, wherein the first primary surfaces are parallel to each other and to the second primary surfaces.

11. A system, comprising:
a conductor having a pair of primary surfaces, the conductor including a through-hole formed therein; and
a printed circuit board that is inserted in the through-hole, the printed circuit board having a current sensor mounted thereon, the current sensor being disposed inside the through-hole, the current sensor including a first magnetic field sensing element and a second magnetic field sensing element having respective axes of maximum sensitivity that are substantially perpendicular to the primary surfaces of the conductor,
wherein the current sensor is configured so that the first and second magnetic field sensing elements are situated outside of the though-hole, and on opposite sides of the conductor.

12. The system of claim 11, wherein:
the conductor includes a first notch and a second notch that are formed on opposite sides of the through-hole, the first notch and the second notch are formed on opposite sides of the through-hole;

the conductor has a thickness of approximately 2 mm, the through-hole has a width of approximately 3 mm, and the first and second notches each have a respective width of approximately 3 mm.

13. The system of claim 12, wherein the through-hole and the first notch are arranged to define a narrow segment of the conductor that has a width of approximately 2.5 mm.

14. The system of claim 11, wherein the through-hole has a width in the range of 2.1-3.1 mm.

15. The system of claim 11, wherein the first and second magnetic field sensing elements include Hall plates.

16. The system of claim 11, wherein the first and second magnetic field sensing elements include at least one of a giant magnetoresistance (GMR) element, a spin valve, an anisotropic magnetoresistance element (AMR), a tunneling magnetoresistance (TMR) element, and a magnetic tunnel junction (MTJ).

17. A system, comprising:
a conductor having a first outer edge, a second outer edge the is opposite to the first outer edge, and a through-hole formed therein between the first outer edge and the second outer edge, the through-hole being defined by a first inner edge of the conductor and a second inner edge of the conductor that is opposite to the first inner edge, the conductor including a first protrusion that extends from the first inner edge towards the second inner edge, and a second protrusion that extends from the second inner edge towards the first inner edge; and
a current sensor that is disposed in the through-hole, the current sensor being disposed adjacent to the first protrusion, the current sensor being arranged to measure a level of electrical current through the conductor,
wherein the first protrusion is formed in a first e portion of the first inner edge and the second protrusion is formed in a second middle portion of the second inner edge, and
wherein the first protrusion, the second protrusion, and the current sensor are disposed on an axis that intersects the through-hole.

18. The system of claim 17, wherein the first protrusion has an oval shape.

19. The system of claim 17, wherein the first protrusion is shaped as a semi-circle.

20. The system of claim 17, wherein the current sensor, the first protrusion, and the second protrusion are centered on the axis, and the axis is perpendicular to the first outer edge and the second outer edge.

21. The system of claim 20, wherein the current sensor is disposed between the first protrusion and the second protrusion.

22. The system of claim 17, wherein the second protrusion has an oval shape.

23. The system of claim 17, wherein each of the first protrusion and the second protrusion has an oval shape, and the first protrusion and the second protrusion have different radii.

24. The system of claim 17, wherein the current sensor includes a first magnetic field sensing element and a second magnetic field sensing element, the first magnetic field sensing element and the second magnetic field sensing element having respective axes of maximum sensitivity that are perpendicular to primary surfaces of the conductor.

* * * * *